US005707922A

United States Patent [19]

Mimori et al.

[11] Patent Number: 5,707,922

[45] Date of Patent: Jan. 13, 1998

[54] ADSORBENT FOR ADSORPTION OF RADIOACTIVE NUCLIDES AND METHOD OF PRODUCING THE SAME, AND PROCESS FOR VOLUME-REDUCTION TREATMENT OF RADIOACTIVE WASTE

[75] Inventors: Takeo Mimori, Hitachinaka; Kazutoshi Miyajima, Toukai-mura; Hideki Takahashi; Tadahiro Mori, both of Uji; Hiroki Iwaya, Kyoto, all of Japan

[73] Assignees: Japan Atomic Energy Research Institute, Tokyo; Unitika Ltd., Hyogo-ken, both of Japan

[21] Appl. No.: 666,080

[22] Filed: Jun. 19, 1996

[30] Foreign Application Priority Data

Jun. 27, 1995 [JP] Japan ................................... 7-160224

[51] Int. Cl.[6] ................................................ B01J 20/02

[52] U.S. Cl. ............................ 502/416; 588/20; 210/682

[58] Field of Search ................................ 588/11, 19, 20; 210/682; 502/416, 417; 264/239

[56] References Cited

U.S. PATENT DOCUMENTS

| | | | |
|---|---|---|---|
| 4,058,456 | 11/1977 | Head | 210/23 R |
| 4,770,715 | 9/1988 | Mandel et al. | 134/40 |
| 5,194,414 | 3/1993 | Kuma | 502/80 |
| 5,256,338 | 10/1993 | Nishi et al. | 252/628 |
| 5,403,809 | 4/1995 | Muller et al. | 502/413 |
| 5,476,989 | 12/1995 | Mimori et al. | 588/20 |
| 5,510,063 | 4/1996 | Gadkaree et al. | 264/29.7 |

*Primary Examiner*—Ngoclan Mai
*Attorney, Agent, or Firm*—Barnes, Kisselle, Raisch, Choate, Whittemore & Hulbert, P.C.

[57] ABSTRACT

An adsorbent for radioactive nuclides incorporating fibrous activated carbon. The adsorbent includes fibrous activated carbon having good adsorption performance, inorganic fiber and inorganic binder. Therefore, the adsorbent exhibits good shape stability when it is formed into a molded piece, has good combustion performance, and is not liable to scattering of radioactive nuclides adsorbed thereon when it is incinerated.

6 Claims, 1 Drawing Sheet

ADSORBENT FOR ADSORPTION OF RADIOACTIVE NUCLIDES AND METHOD OF PRODUCING THE SAME, AND PROCESS FOR VOLUME-REDUCTION TREATMENT OF RADIOACTIVE WASTE

FIELD OF THE INVENTION

The present invention relates to an adsorbent useful for the adsorption of radioactive nuclides which generate, for instance, in the course of reprocessing steps for separation and recovery of valuable substances such as uranium, plutonium and the like from nuclear fuel used in a nuclear reactor, and to a method of producing the same, and also to a process for the volume-reduction treatment of radioactive waste using the adsorbent.

BACKGROUND OF THE INVENTION

Various types of liquid waste accumulated at reprocessing facilities after treatment of spent nuclear fuel discharged from nuclear power stations contain many radioactive nuclides including long-lived β and γ nuclides of cesium and the like and radioactive nuclides such as uranium, plutonium and the like. For the treatment of radioactive liquid waste, it is necessary to reduce the amount of radiation by removing radioactive nuclides from the liquid waste in order to reduce radiation exposure.

Conventionally, radioactive liquid waste is treated by means of evaporation concentration, ion exchanging, coagulating sedimentation, glassification and the like.

In the evaporation concentration process, liquid waste to be treated is put in an evaporator vessel and heated under atmospheric or reduced pressure to allow only moisture to evaporate, thereby concentrating the radioactive liquid waste to a reduced volume. The evaporated moisture is recovered using a condenser. On the other hand, the thus concentrated liquid waste is subjected to further treatment such as bituminization or the like depending on the radioactive nuclides present in the waste.

In the ion exchange process, ionized nuclides are removed from the liquid waste by using an ion exchange resin to effect ion exchange with ions of interest in the liquid waste. The spent resin is treated as solid waste by cement solidification or the like. The treated liquid waste is treated as low-level liquid waste.

In the coagulating sedimentation process, radioactive nuclides in the liquid waste are removed after their coagulation and precipitation. The waste sludge in which radioactive nuclides are contained is subjected to dehydration treatment, and the dehydrated sludge is treated as solid waste. The supernatant fluid is treated as low-level liquid waste.

The glassification process is a recently developed process such that for the treatment of high-level radioactive liquid waste, the liquid waste, after being concentrated, is mixed with glass material, the glass being then melted for removal of its water content, the glass melt being then cooled and solidified so that nuclides are encapsulated in glass.

The prior art processes for treatment of radioactive liquid waste, namely, the evaporation concentration process, the ion exchange process, the coagulating sedimentation process, and the glassification process, respectively involve problems enumerated below.

(1) The evaporation concentration process requires corrosion resistant materials for the evaporator vessel and, in addition, it involves the evaporation of radioactive nuclides accompanying liquid evaporation which lowers the decontamination factor (DF). As such, this process provides only insufficient volume-reduction effect.

(2) The ion exchange process involves generation of large amounts of secondary wastes, such as incombustible spent resin and resin-washed liquid waste, and therefore has insufficient volume-reduction effect. Organic ion exchange resins, if combustible, may serve for volume reduction, but combustion of such ion exchange resin involves toxic gas generation and/or smoke and soot emission, coupled with littering of radioactive nuclide-containing particulate matter. In reality, therefore, it is impossible to incinerate such ion exchange resin.

(3) The coagulating sedimentation process involves sludge formation of high moisture content which entails a difficulty in dehydration treatment. Therefore, the process provides no sufficient volume-reduction effect.

(4) In the glassification process, a concentrated liquid is mixed with glass material, and the mixture is melted. Therefore, the process is subject to limitations in respect of liquid concentration in a pretreatment stage. Further, the glass material is mixed with a large volume of such liquid. This naturally means that a large amount of glass material is used, resulting in the formation of vitrified solids in large number. As such, this process provides no sufficient volume-reduction effect.

That is, with these prior art processes for volume-reduction treatment, various drawbacks have been found including generation of secondary wastes in large quantities, and difficulty in the maintenance of high decontamination factor, and in addition the necessity of using corrosion resistant materials for the equipment employed which entails high capital costs.

In order to solve the foregoing problems, the present inventors previously developed an adsorbent comprised of fibrous activated carbon and, at the same time, developed a process for treatment of radioactive liquid waste using the adsorbent, and a process for volume-reduction treatment of such liquid waste (U.S. Pat. No. 5,476,989).

For use in a treating apparatus, aforesaid adsorbent which is comprised of fibrous activated carbon should be in the form of a molded piece having a cartridge-form configuration or the like. In that case, it is important that the adsorbent, as a molded piece, should exhibit good form stability, that is, non-breakage or non-crack performance, when it is mounted to the treating apparatus or during operation of the apparatus for liquid waste treatment.

In the prior art, for the purpose of molding an adsorbent comprised of fibrous activated carbon, an organic binder has been mainly used in order to produce a form-stable molded piece. However, if the adsorbent had a large organic binder content, during the stage of incinerating the adsorbent after it was used for the treatment of liquid waste, a problem occurred such that it was difficult to carry out smokeless incineration of the adsorbent, with littering of radioactive substances, though in slight amounts, carried in smoke. As a counter-measure against this problem, an attempt was made to use, instead of organic binders, inorganic mixtures comprised of inorganic fibers alone or inorganic mixtures comprised of inorganic binders alone. Such an attempt let to another problem that the form stability of the adsorbent, as an molded piece, was adversely affected. As another attempt to improve the moldability aspect, the proportion of such inorganic mixture was increased, but this resulted in a decrease in the proportion of fibrous activated carbon in the adsorbent, which in turn resulted in a decrease in the adsorptivity of the molded piece and in a decrease in the post-incineration volume-reduction factor.

DISCLOSURE OF THE INVENTION

The present invention is directed to solving the foregoing problems, and accordingly it is a technical task of the invention to provide an adsorbent incorporating fibrous activated carbon which can provide good form stability even if the proportion of inorganic mix is reduced, and can exhibit significant post-incineration volume reduction, and which involves no litter of radioactive nuclide during incineration.

It is another technical task of the invention to provide a process for volume-reduction treatment of radioactive waste wherein the adsorbent incorporates glass fibers so that the glass component is allowed to melt to form a vitrified solid when the adsorbent is incinerated, whereby post-incineration residue handling can be made easier.

In order to achieve these tasks, the inventors of the present invention have conducted intensive studies and, as a result, they have reached the invention. The adsorbent for adsorption of radioactive nuclides in accordance with the present invention comprises fibrous activated carbon, inorganic fibers, and an inorganic binder. The inventors have found that an adsorbent which comprises fibrous activated carbon having good adsorptivity, inorganic fibers, and inorganic binder can exhibit good shape stability, when in the form of a molded piece, and high combustibility, and that the adsorbent involves no litter problem with respect to radioactive nuclides adsorbed by the adsorbent. The invention is based on these findings.

According to the process for volume-reduction treatment, the inorganic fibers of the adsorbent are partially or wholly replaced with glass, and a radioactive liquid waste containing radioactive nuclides is subjected to an adsorption treatment using the adsorbent, then the spent adsorbent is subjected to an incineration treatment at a temperature not lower than the ignition point of the fibrous activated carbon for incineration of the fibrous activated carbon and, at the same time, the glass component is melted at a temperature not lower than the melting temperature of the glass, and subsequently the glass melt is cooled and solidified. In other words, the inventors have found that by incinerating an adsorbent whose inorganic fiber component is partially or wholly replaced with glass fibers at a temperature not lower than the ignition point of the fibrous activated carbon it is possible to allow the fibrous activated carbon only to be almost completely gasified and scattered, and that by melting the glass component at a temperature not lower than the melting temperature of the glass, then solidifying the glass melt, it is possible to form a vitrified solid in which is encapsulated radioactive incineration residue. Thus, they have reached the present invention.

DETAILED DESCRIPTION OF THE INVENTION

The invention will now be described in detail.

Fibrous activated carbon, as a component material of the adsorbent of the invention, may be one obtained as such from coal pitch, petroleum pitch, rayon, phenolic fiber, acrylic fiber, or the like. The specific surface area of the fibrous activated carbon is acceptable if it is sufficient to adsorb radioactive nuclides thereon. It is noted, however, that the larger the specific surface area, the greater is the quantity of radioactive nuclides adsorbed thereon. Preferably, therefore, the specific surface area is 1000 $m^2/g$ or more, more preferably 1500 $m^2/g$ or more.

Preferably, the fibrous activated carbon has, in its composition, carbon, oxygen and hydrogen in a total of 60% or more, more particularly 80% or more. If the total proportion of these ingredients is less than 60%, the smokeless combustibility is adversely affected and there may occur toxic gas generation.

Examples of useful inorganic fibers include glass fiber, rock wool, alumina fiber, ceramic fiber, silicon carbide fibers, and carbon fiber. One or more kinds of these fibers may be used, and inter alia glass fiber and rock wool are preferably used. In particular, for purposes of enhancing form stability, fibrillated inorganic fibers, such as rock wool, are preferred because they exhibit a greater degree of interlocking with the fibrous activated carbon.

In case that glass fiber is used as inorganic fiber component, the glass fiber may be any glass fiber of the type which melts at a temperature not lower than the ignition point of the fibrous activated carbon. However, one which melts at as low a temperature as possible is preferred. For example, fibrous materials, such as silicate glass, phosphate glass, borate glass, lead glass, chalcogens glass, and fluoride glass, may be used as such.

Glass fiber may be incorporated in place of a portion or the whole of the inorganic fiber. In case where post-incineration glassification is required, the proportion of glass fiber is increased; and where no glassification is required, glass fiber need not be incorporated or may be partially incorporated.

The inorganic binder may be any inorganic binder of the type which can be solidified by air drying or heat treatment or the like after cartridge formation. Examples of such inorganic binder include lithium ethyl silicate, aluminum sulfate, silica sol, alumina sol, water glass, bentonite, cement, and gypsum. One or more kinds of these may be used as such.

In order to enhance the adsorption of radioactive nuclides, it is desirable that the fibrous activated carbon be rendered hydrophilic. Preferably, the fibrous activated carbon has an equilibrium moisture of 10% or more when the relative humidity is 45%.

To obtain a fibrous activated carbon having an equilibrium moisture of 10% or more at a relative humidity of 45%, various known methods may be employed including oxidation by air, oxidation by ozone, liquid-phase oxidation, or attachment of hydrophilic functional groups or the like.

In order to enhance the adsorption of radioactive nuclides, a fibrous activated carbon treated for such functional group attachment may be used as a component of the adsorbent. Functional groups useful for such attachment include, but without limitation to, for example, organofunctional groups, such as carboxyl group, iminodiacetic group, sulfonic group, phosphoric group, aminophosphoric group, primary to tertiary amino groups, quaternary ammonium base, polyamine group, pyridine group, and amidoxime group; and inorganic functional groups, such as iron and titanium.

For fabrication of a cartridge, one method comprises dispersing fibrous activated carbon, inorganic fiber, and inorganic binder in predetermined quantities in water, sucking them into a cylindrical or circular tube form mold thereby to cause them to be formed into a predetermined shape, then subjecting the shaped structure to dehydration, drying, and heat treatment thereby to solidify the inorganic binder. Another method available is such that above mentioned components are formed into a sheet form by using the paper making technique, the sheet being wound in a coaxially stacked cylindrical fashion, the wound sheet being then solidified by heat treatment to be formed into a cylindrical shape. Any method in which all of the Components, i.e., fibrous activated carbon, inorganic fiber, and inorganic binder are premixed before they are formed into shape is hereinafter referred to as "method A".

There is another method available such that a cylindrical or circular tube-form structure is preformed from the fibrous activated carbon and inorganic fiber only, the preform being then impregnated with inorganic binder, the impregnated preform being then dried and solidified to be formed into a cartridge. Any method in which forming is first carried out using the fibrous activated carbon and inorganic fiber in this way before impregnation with inorganic binder is carried out is hereinafter referred to as "method B". According to method B, it is possible to reduce the total quantity of the inorganic fiber plus the inorganic binder. This in turn results in a decrease in the quantity of the post-incineration residue. Other methods may also be used in cartridge fabrication.

Where the method A is employed, the mixture ratio of fibrous activated carbon, inorganic fiber, and inorganic binder is preferably 50 to 77 parts by weight of fibrous activated carbon:20 to 47 parts by weight of inorganic fiber:3 to 15 parts by weight of inorganic binder, based on a total of 100 parts by weight. Especially preferably, the ratio is 55 to 70 parts by weight of fibrous activated carbon:25 to 35 parts by weight of inorganic fiber:5 to 15 parts by weight of inorganic binder.

Where the method B is employed, the mixture ratio of fibrous activated carbon, inorganic fiber, and inorganic binder is preferably 50 to 89 parts by weight of fibrous activated carbon:10 to 40 parts by weight of inorganic fiber:1 to 15 parts by weight of inorganic binder, based on a total of 100 parts by weight. Especially preferably, the ratio is 65 to 82 parts by weight of fibrous activated carbon: 15 to 30 parts by weight of inorganic fiber: 3 to 10 parts by weight of inorganic binder.

In each of the methods A and B, if the proportion of the fibrous activated carbon is less than its lower limit, there occurs a decrease in the quantity of radioactive nuclide adsorption. If the proportion of the fibrous activated carbon exceeds the upper limit therefor, the proportions of the inorganic fiber and inorganic binder are lowered correspondingly, with the result that the required cartridge strength cannot be obtained when a cartridge is formed. If the proportion of the inorganic fiber is less than the lower limit therefor, the cartridge is of lower strength when it is formed. If, on the contrary, the proportion of the inorganic fiber exceeds the upper limit therefor, the proportion of the fibrous activated carbon is lowered accordingly, so that the quantity of radioactive nuclide adsorption is lowered, which in turn results in a decrease in volume-reduction factor. If the proportion of the inorganic binder is less than the lower limit therefor, the cartridge is of lower strength when it is formed. If the proportion of the inorganic binder exceeds the upper limit therefor, there may occur a problem such as pore clogging of fibrous activated carbon, with the result that the quantity of radioactive nuclide adsorption by the adsorbent is lowered.

According to the present invention, any liquid waste containing radioactive nuclides may be subjected directly to adsorption treatment by an adsorbent comprising fibrous activated carbon. Another method which may be preferably employed is such that a radioactive nuclide-containing liquid waste is added with, for example, complex compounds such as ethylenediamine tetraacetic acid (EDTA), tributyl phosphate, bis-(2-ethylhexyl) phosphate, 2-ethylhexyl phosphonate mono-2-ethylhexyl ester, triethylamine, trioctylamine, and phthalocyanine, whereby a complex of such compound with radioactive nuclides is formed so as to enhance ease of adsorption by the adsorbent; and then adsorption treatment is carried out using an adsorbent comprising the fibrous activated carbon.

Depending upon the type of radioactive nuclide, there may occur changes in ion forms and/or condition of dispersion due to the effect of pH, which in turn cause variations in the adsorption performance of the fibrous activated carbon. In order to improve the efficiency of adsorption treatment, therefore, it is desirable that alkalis or acids, such as NaOH, HCl, and $HNO_3$ be added for adjustment to a suitable pH before adsorption treatment is carried out.

Specifically, for the purpose of treating radioactive liquid waste, any techniques known in the art may be employed. Examples of such techniques useful for the purpose include batch method using an adsorption bath, column immersion method using an adsorption tower, cartridge immersion method, and combinations of these methods. Also, other immersion method may be employed in which a sheet or cartridge molded from fibrous activated carbon is used as an adsorbent.

The incineration of radioactive nuclide-containing adsorbents from the process of adsorption treatment is carried out at a temperature which is not lower than the ignition point of the fibrous activated carbon as a component of the adsorbent and which is not lower than the melting temperature of the glass component. The term "ignition point" herein refers to a temperature measured according to the method of ignition point measurement of Japanese Industrial Standard, "K-1474"(activated carbon test method), the temperature corresponding to a point at which a rapid temperature rise begins when the test piece is heated up as specified. The melting temperature of the glass is a temperature at which glass fibers melt to exhibit interfiber fusing. When the fibrous activated carbon is heated up to the ignition point or higher, it turns red and goes into smokeless combustion while undergoing volume reduction. Presumably, the reason for this may be that carbon constitutes a dominant part in the composition of the fibrous activated carbon and becomes scattered in the form of carbon dioxide gas.

One method for incineration of such adsorbent is that incineration is carried out in one operation at a temperature not lower than the ignition point of the fibrous activated carbon, a main component of the adsorbent, and not lower than the melting temperature of the glass component. Among other methods there is a two-stage incineration method such that first-stage incineration is carried out at a temperature not lower than the ignition point of the fibrous activated carbon, a main component of the adsorbent, and lower than the melting temperature of the glass component, and at a second stage the temperature is increased to a point not lower than the melting temperature of the glass to thereby melt the glass.

According to the present invention, spent adsorbent which contains radioactive nuclides may be supplied directly to the incineration stage, but it is preferable that spent adsorbent is subjected to dehydration and drying before it is supplied to the incineration stage.

As described above, according to the invention, the adsorbent comprises fibrous activated carbon having good adsorption performance with respect to radioactive nuclides, inorganic fibers and inorganic binder. Therefore, it is possible to provide a molded piece having good form stability even when the proportions of the inorganic fiber and inorganic binder are reduced. Further, the fact that the adsorbent includes fibrous activated carbon provides for excellent combustion performance and an increase in the post-incineration volume-reduction factor. This provides a solution to the problem of storage space arising from increased waste volume and also prevents the scattering of radioactive nuclides during incineration operation.

According to the invention, the inorganic fibers include a glass component which melts at a temperature not lower than the ignition point of the fibrous activated carbon, and that incineration treatment is carried out at a temperature not lower than the ignition point of the fibrous activated carbon thereby to incinerate the fibrous activated carbon. At the same time, the glass component is melted at a temperature not lower than the melting temperature of the glass, and then the glass is cooled and solidified. Therefore, any incineration residue which is composed principally of nonvolatile radioactive nuclides and coexisting metallic components is encapsulated in the vitrified glass solid. This provides for easy handling of incineration residue and affords ease of storing the residue in a container.

DESCRIPTION OF THE EMBODIMENTS

Figure 1:
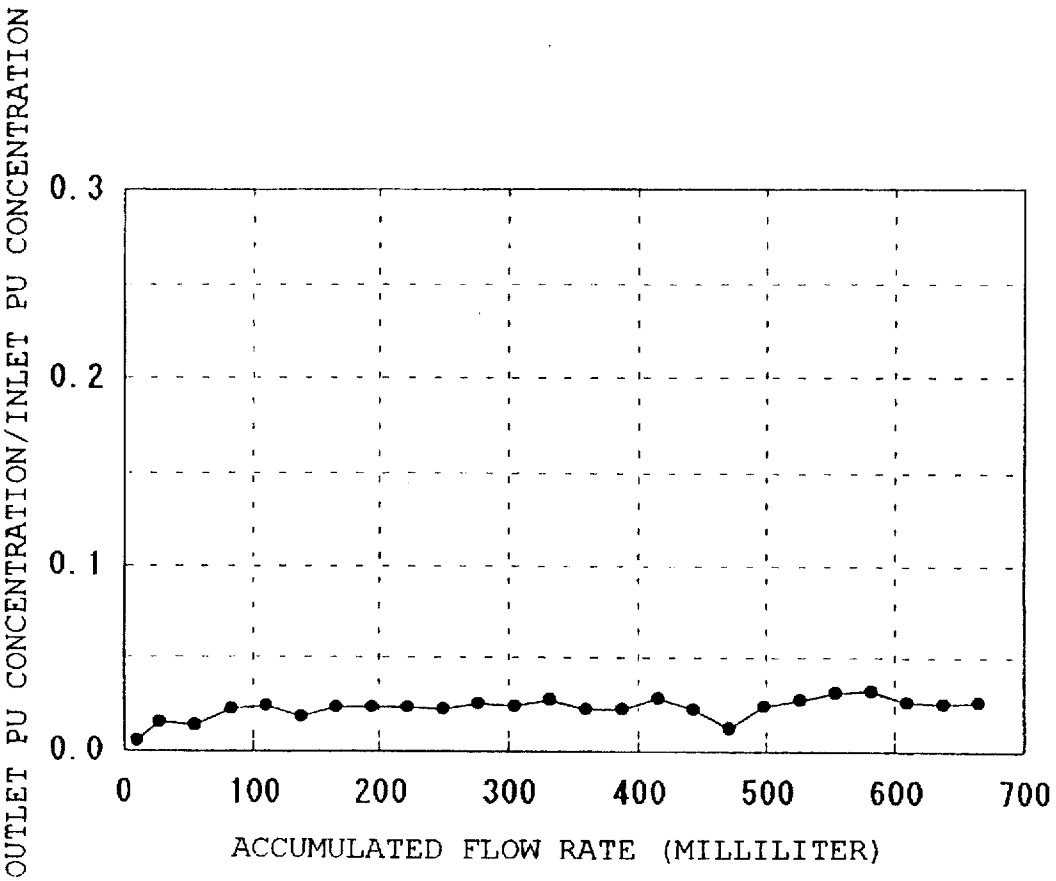
FIGURE 1 is a graph showing the plutonium removal efficiency of the adsorbent for radioactive nuclides in one embodiment of the invention.

Next, the invention will be explained in more specific details with reference to Examples given below.

EXAMPLES 1 to 6; Comparative Examples 1 to 5

Fibrous activated carbon ("A-20", made by Unitika, Ltd.; specific surface area, 2100 $m^2/g$), 1 kg, was immersed in 100 liters of 3N nitric acid solution and subjected to treatment at ordinary temperature for 2 hours. After treatment, the fibrous activated carbon was removed and washed. Washing was stopped when the pH value of the wash liquid reached more than 5.5. Hot air drying was carried out at 120° C. for 2 hours. Thus, a high-hydrophilic fibrous activated carbon was obtained which had a specific surface area of 1996 $m^2/g$, ignition point of 480° C., and an equilibrium moisture of 34 at relative humidity of 45%.

The high-hydrophilic fibrous activated carbon, 65–90 parts by weight, a glass fiber having a melting temperature of 680° C. ["110X-475", made by Shuller (United States)], or rock wool ("Asano CMF", made by Nihon Cement Ltd.), both as inorganic fiber, 5–30 parts by weight, and lithium silicate ("Lithium Silicate 35", made by Nissan Chemical Industries Ltd.), as inorganic binder, 3–20 parts by weight, were used by changing their mixing ratios in various ways, but on the basis of a total of 100 parts by weight. Thus, adsorbents of respective Examples and Comparative Examples were obtained.

In this conjunction, cylindrical cartridges were molded using two different methods, i.e., method A and method B. The mold configuration or shape stability of each molded cylindrical cartridge was evaluated on the basis of its strength in both dry condition and wet condition. In other words, shape stability evaluation was made at the limit to which the molded piece was safe against breaking or cracking when handled during the process of cartridge forming. Adsorption performance was evaluated in terms of specific surface area retention ratio. Specific surface area retention was expressed by the retention ratio (%) of specific surface area of the fibrous activated carbon after cartridge molding to the specific surface area of the original fibrous activated carbon. The results are shown in Table 1.

TABLE 1

| | Molding Composition (wt parts) | | | | Inorganic binder add method | shape stability | Specific surface area retention ratio (%) |
|---|---|---|---|---|---|---|---|
| | Fibrous activated carbon | Inorganic fiber: Glass fiber | Inorganic fiber: Rock wool | Inorganic binder | | | |
| Comparative Example 1 | 90 | 5 | — | 5 | Method A | x | 95 |
| Comparative Example 2 | 80 | 15 | — | 5 | Method A | x | 95 |
| Example 1 | 70 | 25 | — | 5 | Method A | o | 95 |
| Example 2 | 70 | — | 25 | 5 | Method A | o | 95 |
| Example 3 | 65 | 30 | — | 5 | Method A | ⊚ | 95 |
| Example 4 | 70 | 20 | — | 10 | Method A | ⊚ | 80 |
| Comparative Example 3 | 65 | 15 | — | 20 | Method A | ⊚ | 60 |
| Comparative Example 4 | 90 | 5 | — | 5 | Method B | x | 90 |
| Example 5 | 80 | 15 | — | 5 | Method B | ⊚ | 90 |
| Example 6 | 77 | 20 | — | 3 | Method B | o | 95 |
| Comparative Example 5 | 65 | 15 | — | 20 | Method B | ⊚ | 50 |

⊚: Shape stability very good
o: Shape stability good
x: Shape stability improper

EXAMPLE 7

Seventy parts by weight of the high-hydrophilic fibrous activated carbon used in Example 1, and 23 parts by weight of glass fiber ["110X-475", made by Shuller (United States)] were mixed together in a liquid bath, and then a cylindrical mold having an inner diameter of 15 mm and a length of 100 mm, as set to a suction device, was introduced into the bath, whereby a suction operation was carried out to prepare a molded piece. After hydro-extraction by vacuum suction, 7 parts by weight of lithium silicate ("Lithium Silicate 35", made by Nissan Chemical industries Ltd.) aqueous solution were supplied into the bath for impregnation purposes (method B). Subsequently, the molded piece was removed from the mold and was dried at 130° C. for 12 hours. Thus, a cylindrical adsorbent cartridge having an outer diameter of 15 mm and a length of 97 mm was obtained. This adsorbent cartridge was found rigid and exhibited good shape stability.

This cartridge was set in a glass column having an inner diameter of 15 mm and a length of 300 mm, and into the column was fed a radioactive liquid waste comprised of a nitric acid solution having a plutonium concentration of $1.19 \times 10^{-4}$ mg/ml, a uranium concentration of 4.47 mg/ml, and an acid concentration of 0.92N, at a flow rate of 28 ml/hr (SV 1.62 $hr^{-1}$) to a total of 670 ml.

The resulting plutonium removal efficiency is shown in FIG. 1. The removal efficiency was 97% or more, proving good adsorption performance.

Next, the cartridge used for treatment of the radioactive liquid waste was subjected to incineration at 550° C. for 1 hour under an air flow of 45 ml/min. The fibrous activated carbon was incinerated smokeless, and no scattering of radioactive nuclides was observed. Then, the temperature was increased to 750° C. and this temperature was maintained for 30 minutes. As a result, a vitrified glass solid in which radioactive nuclides were encapsulated was obtained. This vitrified glass solid was rigid and exhibited good handlability. Its weight was equal to 33 parts by weight relative to the initial total weight. This value was about equal to the total weight of the inorganic binder used and the salt in the waste liquid. This showed that the fibrous activated carbon was completely incinerated and flew off.

What is claimed is:

1. An adsorbent for adsorption of radioactive nuclides, wherein said adsorbent is produced by a process which comprises mixing 50 to 77 parts by weight of fibrous activated carbon, 20 to 47 parts by weight of inorganic fibers, and 3 to 15 parts by weight of inorganic binder to a total of 100 parts by weight, and molding the mixture into a cylindrical or tubular cartridge configuration.

2. An adsorbent as set forth in claim 1, wherein said fibrous activated carbon has a specific surface area of 1000 $m^2/g$ or more and an equilibrium moisture of 10% or more when the relative humidity is 45%.

3. An adsorbent as set forth in claim 1, wherein the inorganic fibers include a glass component which melts at a temperature not lower than the ignition point of the fibrous activated carbon.

4. An adsorbent for adsorption of radioactive nuclides, wherein said adsorbent is produced by a process which comprises mixing 50 to 89 parts by weight of fibrous activated carbon and 10 to 40 parts by weight of inorganic fibers, molding the mixture into a cylindrical or tubular cartridge configuration, then impregnating the molded form with 1 to 15 parts by weight of an inorganic binder to a total of 100 parts by weight.

5. An adsorbent as set forth in claim 4, wherein said fibrous activated carbon has a specific surface area of 1000 $m^2/g$ or more and an equilibrium moisture of 10% or more when the relative humidity is 45%.

6. An adsorbent as set forth in claim 4, wherein the inorganic fibers include a glass component which melts at a temperature not lower than the ignition point of the fibrous activated carbon.

* * * * *